(12) United States Patent
Farrell

(10) Patent No.: US 8,910,880 B2
(45) Date of Patent: Dec. 16, 2014

(54) HEATING SYSTEM

(75) Inventor: Christopher C. Farrell, Plymouth (GB)

(73) Assignee: Zenex Technologies Limited, Exeter, Devon (GB)

( * ) Notice: Subject to any disclaimer, the term of this patent is extended or adjusted under 35 U.S.C. 154(b) by 1747 days.

(21) Appl. No.: 12/084,469

(22) PCT Filed: Oct. 9, 2006

(86) PCT No.: PCT/GB2006/003756
§ 371 (c)(1),
(2), (4) Date: Dec. 3, 2008

(87) PCT Pub. No.: WO2007/051967
PCT Pub. Date: May 10, 2007

(65) Prior Publication Data
US 2009/0090310 A1    Apr. 9, 2009

(30) Foreign Application Priority Data

Nov. 1, 2005   (GB) .................................. 0522307.8

(51) Int. Cl.
*F24D 15/02*   (2006.01)
(Continued)

(52) U.S. Cl.
CPC . *F24H 8/00* (2013.01); *Y02B 10/20* (2013.01); *F24H 1/41* (2013.01); *F24H 1/34* (2013.01); *F24D 2200/14* (2013.01); *F24H 1/50* (2013.01); *F24H 1/52* (2013.01); *Y02B 30/102* (2013.01); *F24D 3/08* (2013.01)
USPC ............. 237/8 A; 237/2 A; 237/2 R; 237/8 R; 237/19; 122/15.1; 122/406.1

(58) Field of Classification Search
CPC ..................... B01J 19/0013; B01J 2219/0006; B01J 2219/00087; F23N 2041/04; F24D 17/0031; F24D 19/1051; F24D 3/02; F24D 3/08; F24D 3/10; F24H 1/52; F24H 1/207; F24H 1/186; F24H 1/205; F24H 1/406; B60H 1/00885; Y02B 30/102; Y02B 30/108
USPC .......... 237/8 A, 2 A, 2 R, 19; 122/15.1, 18.1, 122/406.1

See application file for complete search history.

(56) References Cited

U.S. PATENT DOCUMENTS 853,738 A    5/1907 Ruud
1,473,036 A   11/1923 Greenham
(Continued)

FOREIGN PATENT DOCUMENTS

EP           60338 A2 *  9/1982  ................ F24H 1/22
EP       0356609 A1     3/1990
(Continued)

OTHER PUBLICATIONS

"Trans Mach—EP_356609_A1_1.pdf", Machine translation of EP-0356609, http://translationportal.epo.org, Mar. 25, 2012.*
(Continued)

*Primary Examiner* — Kang Hu
*Assistant Examiner* — Daniel E Namay
(74) *Attorney, Agent, or Firm* — Wolf, Greenfield & Sacks, P.C.

(57) ABSTRACT

A heating system comprising a fuel burner in co-operation with a primary heat exchanger, a reservoir for storing warmed water in, and a blending valve, and a controller wherein in use a user can signal to the controller to warm the water in the water store using a heater or by the primary heat exchanger, and when hot water is required water is removed from the water store and mixed with water from a cold main prior to being or after the water from the cold main has been admitted to a further heat exchanger for heating the water.

10 Claims, 8 Drawing Sheets

(51) Int. Cl.
*F24H 8/00* (2006.01)
*F24H 1/41* (2006.01)
*F24H 1/34* (2006.01)
*F24H 1/50* (2006.01)
*F24H 1/52* (2006.01)
*F24D 3/08* (2006.01)
*F24D 15/00* (2006.01)
*F24H 7/04* (2006.01)

(56) References Cited

U.S. PATENT DOCUMENTS

| | | | |
|---|---|---|---|
| 1,490,860 A * | 4/1924 | Smith et al. | 237/19 |
| 1,633,759 A | 6/1927 | Breese, Jr. | |
| 1,725,876 A | 8/1929 | Luthe et al. | |
| 1,790,353 A | 1/1931 | Newell | |
| 2,051,240 A * | 8/1936 | Berryman | 290/2 |
| 2,233,050 A | 2/1941 | Groeniger | |
| 2,331,718 A * | 10/1943 | Newton | 126/101 |
| 2,424,844 A | 7/1947 | Parry | |
| 2,455,988 A | 12/1948 | Fife | |
| 2,456,142 A | 12/1948 | Osterheld | |
| 2,513,045 A | 6/1950 | Patrick et al. | |
| 2,619,326 A * | 11/1952 | McLenegan | 165/240 |
| 3,086,710 A | 4/1963 | Shimko | |
| 3,181,793 A | 5/1965 | MacCracken | |
| 3,241,763 A | 3/1966 | MacCracken | |
| 3,383,495 A | 5/1968 | Laube et al. | |
| 3,515,123 A | 6/1970 | Duncan | |
| 3,522,909 A | 8/1970 | Arant | |
| 3,958,555 A | 5/1976 | Horne | |
| 4,090,474 A * | 5/1978 | Kauffmann | 122/20 B |
| 4,324,207 A | 4/1982 | Leuthard | |
| 4,350,144 A * | 9/1982 | Beckwith | 126/586 |
| 4,358,652 A * | 11/1982 | Kaarup | 219/688 |
| 4,966,127 A * | 10/1990 | Martinez, Jr. | 237/8 A |
| 5,076,494 A * | 12/1991 | Ripka | 237/19 |
| 5,410,989 A | 5/1995 | Kendall et al. | |
| 5,626,287 A | 5/1997 | Krause et al. | |
| 5,701,387 A | 12/1997 | McGugan | |
| 5,730,356 A * | 3/1998 | Mongan | 237/19 |
| 5,918,805 A * | 7/1999 | Guyer | 237/8 A |
| 6,109,339 A * | 8/2000 | Talbert et al. | 165/48.1 |
| 6,464,027 B1 | 10/2002 | Dage et al. | |
| 7,575,001 B2 * | 8/2009 | Kaiser | 126/101 |
| 7,617,802 B2 * | 11/2009 | Le Mer et al. | 122/18.1 |
| 8,042,495 B2 * | 10/2011 | Min | 122/18.1 |
| 8,480,004 B2 * | 7/2013 | Farrell | 237/2 A |
| 2002/0162735 A1 * | 11/2002 | Newman | 203/11 |
| 2003/0052181 A1 | 3/2003 | Bolster | |
| 2003/0089399 A1 * | 5/2003 | Acker | 137/337 |
| 2003/0230300 A1 * | 12/2003 | Luo | 126/638 |
| 2004/0031858 A1 | 2/2004 | Haklander et al. | |
| 2004/0041033 A1 * | 3/2004 | Kemp | 236/12.12 |
| 2004/0237557 A1 * | 12/2004 | Harmon et al. | 62/238.6 |
| 2007/0034702 A1 * | 2/2007 | Rixen et al. | 237/2 A |
| 2007/0084942 A1 * | 4/2007 | Moore et al. | 237/19 |
| 2007/0295826 A1 * | 12/2007 | Farrell | 237/19 |
| 2009/0090310 A1 * | 4/2009 | Farrell | 122/20 A |
| 2009/0133641 A1 * | 5/2009 | Min | 122/14.3 |

FOREIGN PATENT DOCUMENTS

| | | | | |
|---|---|---|---|---|
| EP | 0675326 A | 10/1995 | | |
| EP | 1 039 236 A | 9/2000 | | |
| GB | 2200439 A * | 8/1988 | | F24H 1/10 |
| GB | 2420174 C | 12/2006 | | |
| JP | 08178420 A * | 7/1996 | | F24H 1/00 |
| JP | 2005-274055 A | 10/2005 | | |
| WO | WO 2007051967 A1 * | 5/2007 | | F24H 1/48 |

OTHER PUBLICATIONS

"Trans Mach—EP_675326_A1_l.pdf", Machine translation of EP-0675326, http://translationportal.epo.org, Mar. 25, 2012.*

"EP_675326_A1_l.pdf—MTrans 2", Machine translation of EP-0675326, EPO.org, Sep. 3, 2012.*

Search Report from International Application No. PCT/GB2006/003756, mailed Jan. 15, 2007.

* cited by examiner

HEATING SYSTEM

FIELD OF THE INVENTION

The present invention relates to a heating system.

BACKGROUND OF THE INVENTION

Boilers are routinely provided for producing hot water for washing and bathing, and also for supply to space heating systems, such as radiators or under floor heating. Within a boiler a fuel is combusted to generate hot gas and this gas passes over or around a heat exchanger in order to warm a liquid, often water, within the heat exchanger. A boiler is designed for an expected heat output. It can intuitively be seen that a large boiler has a large "thermal mass" so using a large boiler having a large heat output would be inefficient if only a small heating load is to be serviced. Similarly a small boiler having a relatively small heat output wont be able to adequately supply the heating needs of a large building.

SUMMARY OF THE INVENTION

According to a first aspect of the present invention there is provided a heating system comprising a fuel burner in co-operation with a primary heat exchanger, a reservoir for storing warmed water in, a blending valve, and a controller, wherein in use a user can signal to the controller to warm the water in the reservoir using a heater or the primary heat exchanger, and when hot water is required water is removed from the reservoir or is warmed by passing through the reservoir and mixed with water from a cold water supply prior to being admitted to a further heat exchanger for heating the water.

Preferably the primary heat exchanger comprises at least one heat exchange pipe closely coupled with a plurality of burners and a portion of the heat exchange pipe passes between two or more of the burners such that the heat exchange pipe receives heat from both sides. This scheme improves heat delivery into the heat exchange pipe allowing the combined burner and heat exchanger combination to be physically smaller than prior burner and heat exchanger combinations for the same "power output". The provision of multiple burners also allows the range of modulation of the boiler output to be varied over a greater range. Modulators allow the amount of gas admitted into the manifold to be varied. Typically a modulator has a 3 to 1 or 4 to 1 modulation ratio. Thus a boiler having a 30 kW rate can be run down to around an 8 kW minimum. However, if the burners have been sub-divided into small burners, then some of them can be switched off altogether. So, using the same modulator, if four burners are provided then the boiler can be modulated down to 2 kW. Also modulators need not be provided for every burner as two or three burners can be used in an on or off mode with fine control being provided via each burner having a modulator.

Advantageously the fuel burners are provided as elongate burners and portions of the pipe loop around the burners and these looping portions are intermediate portions of the pipe that pass between the burners. This looping arrangement allows the pipe to meander around and between the burners in a generally helical style such that a repeating pattern of looping occurs and that the pattern is repeated in a direction parallel to the longitudinal axis of the fuel burners.

Advantageously the burner and heat exchanger combination is provided within a boiler, and the boiler may include or be in combination with a secondary heat exchanger for extracting further heat from combustion products (hereafter known as flue gas) from the burner.

The secondary heat exchanger advantageously includes a thermal store such that the secondary heat exchanger extracts heat from the flue gas and stores the heat within the thermal store. Heat from the thermal store may be delivered to cold water entering the boiler for hot water generation or alternatively heat from the thermal store may be used to warm water within or entering the reservoir.

Advantageously water warmed by the secondary heat exchanger or water warmed by the thermal store may be mixed by a mixing device, such as a mixing valve, with water from a cold main prior to delivery to a water heating circuit of the boiler. Thus water entering the water heating circuit is warmer than the water main temperature and as a consequence temperature rise that needs to be imparted by a boiler is reduced. This results in either the boiler having to work less hard, and consequently burn less fuel, and/or the maximum flow rate for a given temperature rise from the cold main temperature to the required hot water temperature being increased compared to those arrangements where no warmed water is available from the reservoir or the secondary heat exchanger.

The reservoir, which can also be regarded as being a water store may receive water from a cold main or a header tank. Thus the water is suitable for delivery from the store to a tap.

In an alternative arrangement the reservoir/water store may be selectively connectable to the water used in a space heating circuit. This water often becomes discoloured and circulates in a closed loop and hence is not suitable for delivery to a tap. In such an arrangement a heat exchanger is provided within the water store and water for delivery to a tap or other water outlet for use in, for example, washing passes through the heat exchanger in the water store.

Preferably the controller is responsive to a user interface, such as a button, for instructing the boiler to warm the reservoir of water.

BRIEF DESCRIPTION OF THE DRAWINGS

Embodiments of the present invention will be described, by way of example, with reference to the accompanying Figures in which.

DESCRIPTION OF PREFERRED EMBODIMENTS

There is a general desire to achieve boilers, whether domestic or industrial, that occupy as small a space as reasonably possible whilst maintaining efficiency. Additionally users want heat output, for example to provide hot water for washing, quickly.

Figure 1:
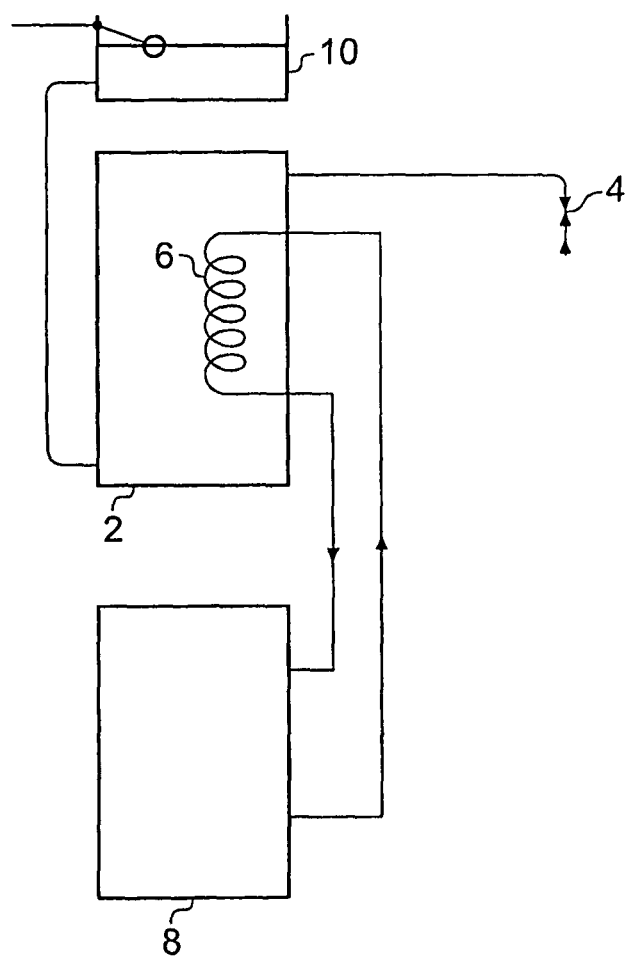
FIG. 1 schematically illustrates a prior art hot water system.

One solution to providing hot water quickly was to provide a tank which held water that had been warmed to a desired hot water output temperature. Thus, as shown in FIG. 1 a storage tank 2 was connected so as to deliver warmed water form an upper region of the tank, for example, for running a bath. The tank 2 has a heater or heat exchanger therein such that the water can be warned to a desired temperature for use. In this example a heat exchanger 6 is warmed by a fuel burning boiler 8. Water is admitted into the tank 2 via a header tank 10.

This solution to providing hot water has several drawbacks.

1) The tank looses heat—so the water requires periodic heating even if no water is drawn from the tank. This is inefficient.
2) As hot water is drawn from the tank, cold water must enter the tank. The cold water mingles with the hot water and cools it while it is still in the tank. Thus, if 100 liters of water was pre-warmed to 50° C. for use and the cold main temperature was 10° C., then once 50 liters of hot water had been run the introduction of 50 liters of cold water would result in an average water temperature in the tank of just 30° C. This means that, for example, to ensure that sufficient water will be available to fill a hot bath, the tank needs to be considerably bigger than the volume of the bath. Thus more water is heated than is needed.

An alternative system that has found favour is the so called combination boiler where the boiler can provide real time heating of hot water for washing and the like, but also warms water for space heating use. However, the efficiency of the boiler can vary with its heat output. Indeed when the boiler is a condensing boiler it is more efficient when in its condensing mode (generally for supplying water for space heating) and less efficient when working at maximum for hot water heating for washing and the like.

Figure 2:
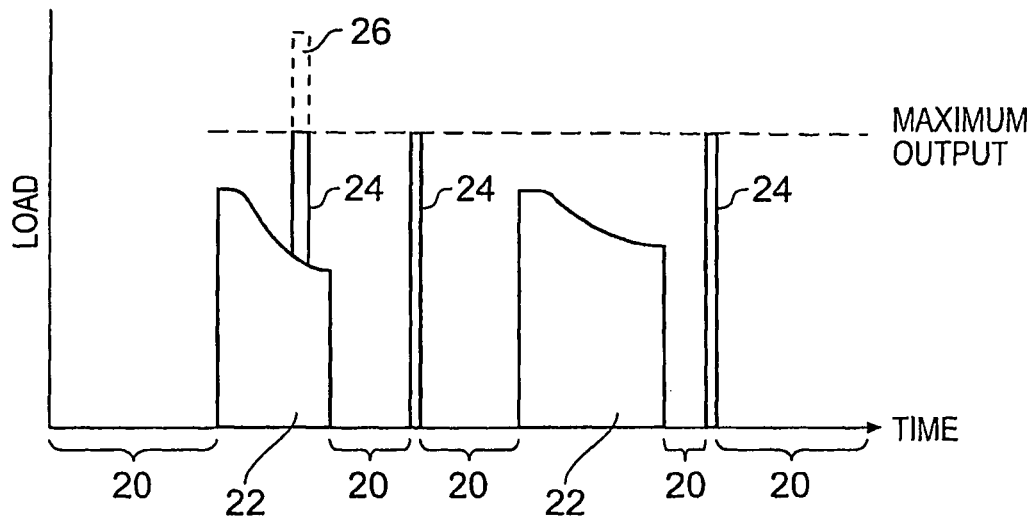
FIG. 2 is a graph of boiler heat demand versus time for a domestic dwelling.
Figure 3:
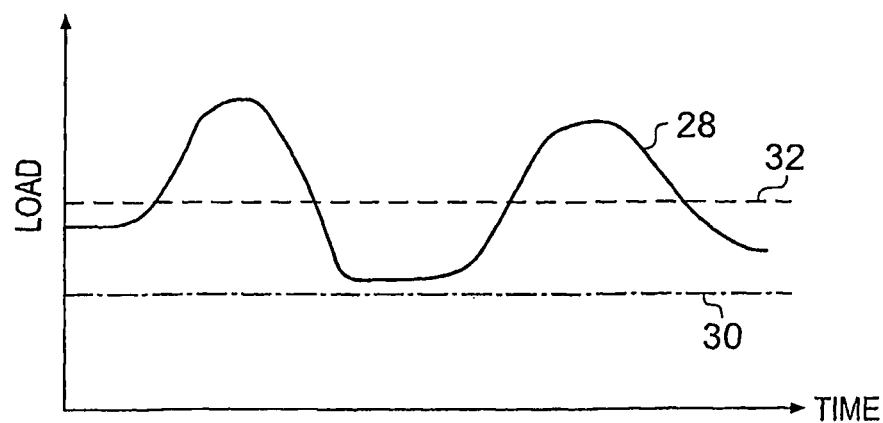
FIG. 3 is a graph of boiler demand versus time for an industrial installation.

The inventor has noted that the demand on a boiler varies considerably over a day. FIG. 2 illustrates the heat demand on a boiler that might be expected in a house. FIG. 3 illustrates the demand that might be experienced in a hotel or sports centre.

In the example of FIG. 2, the heating system may be off for various periods 20 during the day and night so as to reduce the overall fuel cost. The boiler may then switch on under the control of a timer to provide space heating in the times designated 22. As the building heated by the boiler begins to warm then the space heating load may decline. The occupants may also draw hot water for bathing and washing at times designated 24. The water will, in general, be heated at the maximum rate possible by the boiler, as shown by the chain line labelled "maximum output". However, during these hot water use periods a user may be reducing the flow rate at a tap so as to maintain a target temperature whereas if the water could be heated at the flow rate a user wished for and to the temperature the user wished for then the load 26 on the boiler would be in excess of the rated maximum of the boiler.

Similar considerations apply in the scenario illustrated in FIG. 3, but the statistical effect of having a larger number of users and seeking to maintain a more stable temperature smooths the demand 28 on the boiler (especially when used for space heating as well as hot water) although the demand still fluctuates above a minimum value 30 and has an average value 32.

The inventor has noted that hitherto boilers have been reactive to increased demand, for example for hot water, and this has impeded the performance of the boilers.

A boiler's performance in delivering hot water for washing and the like would be much improved if it could be informed of a hot water demand, or predict the demand, prior to the demand occurring and prewarm a volume of water to be mixed with water being heated within the boiler to directly service the hot water demand. A proportion of the water is heated in the style of a combination boiler and is blended with water that had been heated by the boiler and placed in a temporary, and generally low volume, store internal or external to the boiler.

The preheating of the store of water may be in response to a user activated command to signal that the user will soon draw hot water form the boiler. Alternatively a timer could be used to enable warming of the temporary store.

A further feature of producing a compact boiler is the provision of a compact heat exchanger.

The inventor has realised that temperature rise produced by a heat exchanging unit of a given size could be increased if more of the surface of the heat exchange pipe was exposed to flame.

Figure 4:
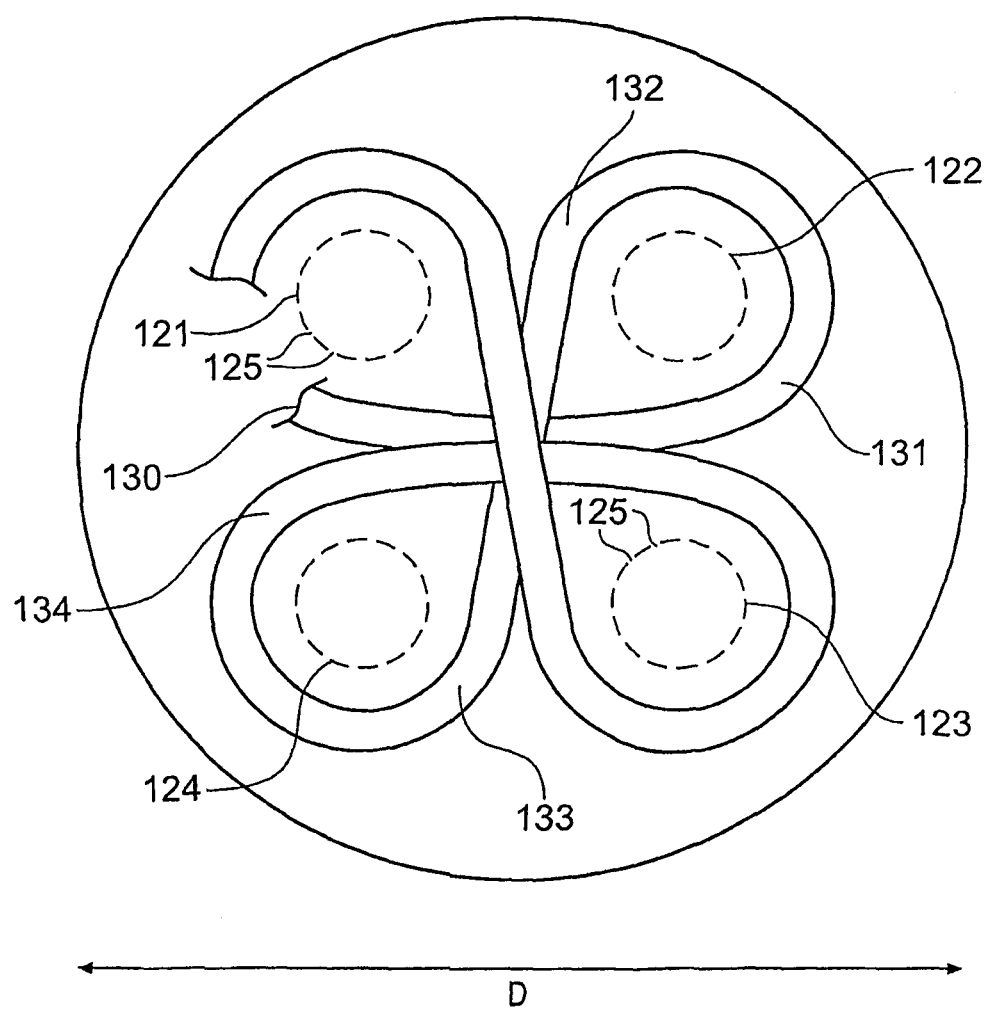
FIG. 4 schematically illustrates a burner and heat exchanger combination constituting an embodiment of the present invention.

FIG. 4 shows, in enlarged form, a heat exchanger constituting an embodiment of the present invention.

In the arrangement shown in FIG. 4 a plurality of burners, in this case four burners designated 121 to 124 are provided. Each burner has a plurality of apertures 125 through which gas can escape from the interior of the burner pipe. It might initially be thought that the cross sectional areas of the burner pipes 121 to 124 should match the cross-sectional area of a single burner pipe of the prior art in order to achieve similar performance although as we shall see, this is not necessarily the case and in fact the cross sectional area of the pipes shown in FIG. 4 can be less than the cross-sectional area of the prior art pipe. The burners 121 to 124 may be connected to a common gas manifold such that they all receive gas in unison or, alternatively one or more of the burners may have an independent gas supply such that not all of the burners 121 to 124 need to be in use simultaneously. In such an arrangement only one or two of the burners needs to be associated with a variable flow modulator in order to provide a wide range of boiler output power.

FIG. 4 schematically illustrates a single complete loop of the pipe. By this, it is meant that it shows the pipe starting from the first burner 121 and returning to the first burner 121. It is to be realised however that the layers of the pipe have become displaced longitudinally along the axis of the burner and hence multiple versions of this complete loop unit effectively extend side by side along the lengths of the burners. Starting at the point 130 it can be seen that the pipe extends between burner 121 and 124 towards a point 131 where it is intermediate burners 122 and 123. Therefore this section of the pipe between portion 130 and portion 131 receives heat from both sides. The pipe then loops round the second burner 122 from region 131 to region 132 where it starts to become broadly between the first burner 121 and the second burner 122. The pipe then has a substantially linear section from region 132 to region 133 where burners are effectively positioned on both sides of the pipe and hence once again it receives heat from both sides. The pipe then loops around the fourth burner 124 from region 133 to region 134. From region 134 another linear section commences where the pipe extends between the burners and so on.

It can thus be seen that there are significant portions of the pipe where effectively both sides of the pipe, as viewed from above, receive heat from the burners. This is an efficient and compact burner design.

Figure 5:
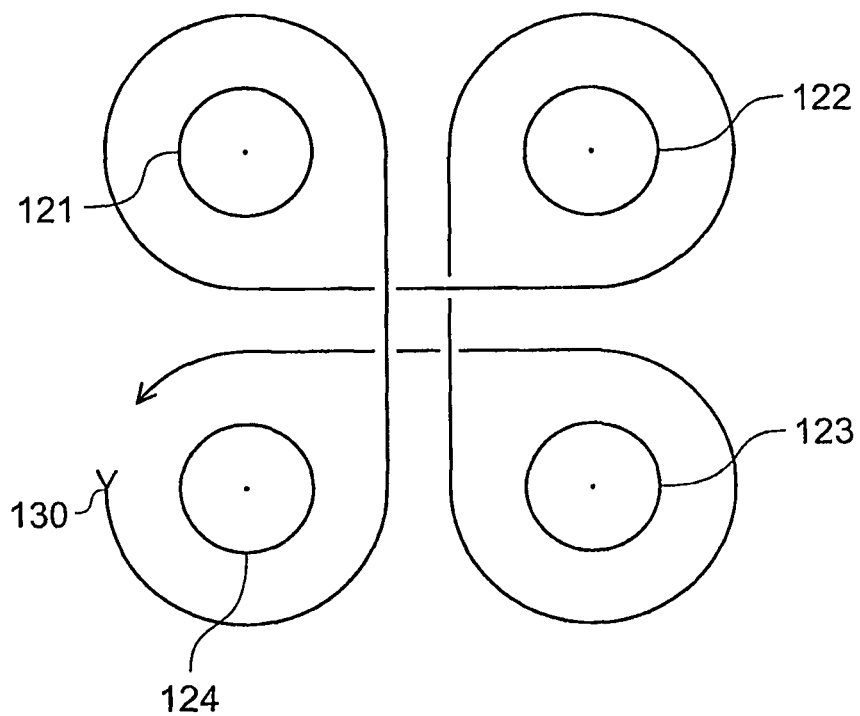
FIG. 5 schematically illustrates in simplified form a further burner and heat exchanger constituting an embodiment of the present invention.

FIG. 5 shows an alternative arrangement to that shown in FIG. 4. For simplicity only the central axis of the heat exchange pipe has been shown as it loops its way around the burners 121 to 124.

Figure 6:
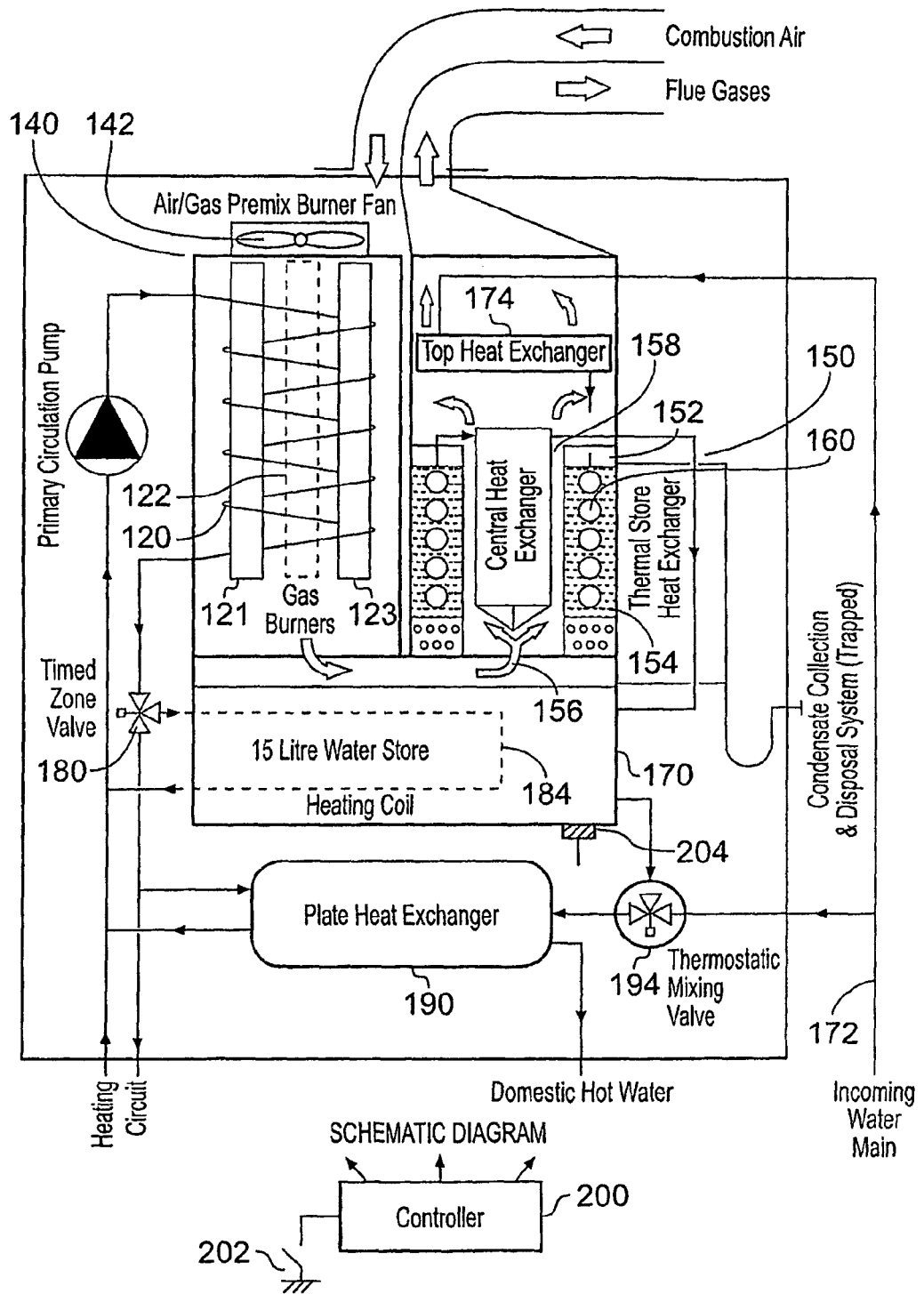
FIG. 6 schematically illustrates a boiler constituting an embodiment of the present invention.

FIG. 6 shows a schematic diagram of a boiler including a burner and heat exchanger assembly, generally designated 140 constituting an embodiment of the present invention.

The burner assembly premixes air with the gas prior to induction into the burner tubes 121 to 123. The heat exchange pipe 120 meanders along the length of the burner assembly 140 which is, in this embodiment, arranged vertically such that air is drawn into the top of the burner assembly by a fan 142 and the combusted gas exits from a bottom region of the assembly and is then directed towards a second heat exchange unit generally designated 150 and as described in co-pending patent application GB 0506290.6, (GB 2420174). In essence the secondary heat exchanger 150 comprises a vessel 152 containing water 154 which acts as a thermal store and is warmed by the flue gas 156 passing along a central duct 158 within the heat exchanger. Usefully the water 154 within the vessel 152 is replenished by liquid condensing out of the flue gas. Thus the vessel 152 is open to the atmosphere and consequently does not present a risk by virtue of pressure building up within the vessel and causing it to rupture. The vessel 152 has a lid with apertures therein such that condensate can collect on the lid and enter the vessel, but the liquid within the vessel is shielded from the gas flow so as to inhibit evaporation from the interior of the vessel. This causes the water 154 to be warmed. A helical pipe 160 is disposed within the water 154 and can be used to remove heat from the thermal store 154 and to deliver that heat elsewhere. The pipe 160 may, for example, be connected to a further heat exchanger within a reservoir 170. However, as shown in this case, the pipe 160 is connected so as to receive water from the cold main 172 optionally via a top plate heat exchanger 174 and to deliver the warm water into the reservoir 170. A further heating arrangement may be provided within the reservoir 170 and thermal store 154, for example an electric heater, to occasionally raise the temperature to that sufficient to inhibit growth of, or kill, legionella bacteria.

The heat exchanger pipe 120 is connectable via a valve 180 to either an external space heating circuit (not shown in detail) or to a further heat exchanger, for example a heating coil 184 disposed within the reservoir 170. Optionally the valve 180 might also be arranged to direct the warmed water from the heat exchanger 120 solely into a plate heat exchanger 190 for providing domestic hot water. This has the advantage that the thermostatic controller may be arranged to achieve a first target temperature for space heating and a second, higher, target temperature for hot water delivery.

A mixing valve 194 is provided between the cold water main 172 and the heat exchanger 190 which acts to provide domestic hot water. The mixing valve has a further input connected to the reservoir 170. In use the mixing valve can blend warmed water from the reservoir 170 with cold water from the cold water main 172 such that the temperature of the water provided at an inlet to the heat exchanger 190 is warmer than the cold main temperature. This means that the temperature rise that needs to be imparted by the boiler to achieve a target domestic hot water temperature is reduced and either the burners can be moderated to burn gas at a lower rate or the flow rate through the boiler is enhanced. Indeed, initially all the water may be drawn from the reservoir 170 so that for small draws of hot water the boiler may not need to fire.

The improved burner and heat exchanger combination means that this unit can be made smaller for a given power output than has conventionally been the case. This in turn means that the space is freed up within the boiler casing can be used to include the secondary heat exchanger unit 150. Looking more critically at a boiler's operation, a boiler can be considered as having to service two types of load.

A first load is a background load, which in a domestic environment could represent the load from the space heating requirement once a start up phase has finished, or in commercial concerns may represent a combined space heating and average water heating load.

A second load is a short term high heat demand in excess of the background load.

Boilers are sized to meet this peak load demand and typically this also represents the least efficient phase of boiler operation—because the burn rate is so fast that the hot flue gas spends less time in contact with the heat exchanges and gives up less of its heat. Thus meeting the peak demand gives rise to physically larger boiler and also reduces its efficiency.

The boiler/heater system shown in FIG. 6 has the advantage of enhancing the boiler's ability to deal with a given peak load—for a limited time period—by storing heat recovered from the flue gas. This in turn means that the gas burners do not have to be as large as they would have been to meet the peak load and hence can be physically smaller—especially when using a heat exchanger passing between and around multiple burner tubes in a serpentine manner. This in turn frees up sufficient space within the size envelope of a domestic boiler (which are typically sized to be mountable within the space occupied by a wall cupboard, typically 450×350× 600 mm) to include the second heat exchange unit 150 with its heat store and also to include a further small tank 170 of preheated water that can be used as part of the domestic hot water supply.

The hot flue gas having passed the primary heat exchanger 120 gives up heat in the secondary heat exchanger 150 and also warms the condensate 154 therein so that a store of heat is available to give up heat to water in the pipe 160. The water warmed within the pipe 160 enters into a storage tank 170 who's outlet allows warmed water in the tank 170 to be blended with water from the cold main such that the water temperature at the input to the domestic hot water heat exchanger 190 is raised and hence the raise in temperature needed to be imparted by the heat exchanger to meet a peak flow is reduced. The water in the tank 170 gets replenished from the cold main, but crucially the water entering the tank 170 has passed through the secondary heat exchanger which also has a thermal store therein able to help the boiler meet short term high flow rate demands with a reduced burner size.

The boiler as described above works well, but can give enhanced functionality when a controller 200 which controls the valves 180, 194 and a gas valve (not shown) is modified to include a switch 202 which the user can actuate to indicate that they wish to use hot water within the near future, but not immediately.

The controller can then check the temperature of the water in the reservoir 170 via thermistor 204 to see if it is at a target value, for example 60°. If not, the controller can operate the boiler to bring the water in the reservoir up to the target temperature.

The hot water from the reservoir can then be blended with cold water from the water supply prior to being heated within the plate heat exchanger 190.

The temporary warming of a small volume of water held within the boiler and just prior to use is efficient and enables the boiler to look as if it has a higher power output—at least over a short period of time.

This can be illustrated by an example. Suppose we wish to run a bath that has a volume of 50 liters.

The target temperature for the bath is 45° C. (this is realistic as the UK health service guide lines suggest a maximum bath temperature of 48° C.).

The boiler can raise ten liters of water per minute by 35° C.

If the input water temperature was 10° C. then the boiler could just raise the water to the required temperature at its maximum flow rate and hence the bath would take five minutes to fill.

However, if the boiler had pre-warmed a volume of water, say 15 liters to 60° C. then this could be blended with the water passing through the boiler reducing the temperature rise that needs to be produced by the boiler and hence enabling a higher flow rate to the top.

The boiler manufacturer does not know in advance how much water a consumer may wish to draw from the boiler, but may make an assumption of, say, a maximum domestic bath size of 60 liters of hot water being required. Consequently the controller could seek to achieve a blend of approximately one part water from the reservoir 170 to three parts water form the cold main.

This would give a temperature at the outlet of the mixing value of 22.5° C.

We know the product of the flow rate and temperature rise at the boiler is a constant so the flow rate supported by the boiler $$\frac{35 \times 10}{42 - 22.5} = 15.55 \, L/M$$

so the bath could be run in just under 3.25 minutes. This briefly gives a hot water output equivalent to a 50% larger boiler.

The water from the valve 194 could be thermostatically controlled to obtain a target temperature such as 25 or 30° C. This would enhance the flow rate still further, although it would not be sustainable for such a long time.

As the reservoir becomes depleted the temperature at the output of the thermostatic valve decreases, and to compensate it increases the proportion of water drawn through the reservoir 170. In the limiting case all the water supplied to the heat exchanger 190 passes through the secondary heat exchanger 150. Surprisingly this is advantageous as two processes come into play.

If we consider a boiler having a constant flow rate, then the water passing through the secondary heat exchanger gets warmed a bit, say 1° C. by the secondary heat exchanger.

This means that, compared to a boiler not having the secondary heat exchanger, we would expect the water at the output of the heat exchanger to be 1° C. warmer. However tests on several boilers indicate that the actual temperature rise is greater. The mechanism to achieve this is not fully understood and it is hypothesised that because the plate heat exchanger circuit is a little warmer that the gas leaving the combustion changer is a little warmer and hence gives up more heat to the secondary heat exchanger than expected, this will be discussed later with reference to FIG. 10.

The boiler may also accept an energy input from other heat sources. Solar heating represents the most common form of providing low level heat. Heat may be provided by solar panels which may warm water in the reservoir by way of a further heat exchanger within the reservoir or the panel may be used to warm water in the thermal store of the secondary heat exchanger. Solar input to the secondary heat exchanger may be provided by solar collectors of modest dimensions. One embodiment of a collector may be a dark metallic or plastic collector connected to the condensate store of the secondary heat exchanger to provide heat flow into the thermal store of the secondary heat exchanger via convection. A flow control valve or a temperature operated valve can be provided to prevent heat being lost from the store to the solar collector.

Another design of collector is a pipe embedded in a granular material such as sand so as to protect it from frost damage and placed in a container such as a pipe or a box optionally with a transparent cover.

Figure 7:
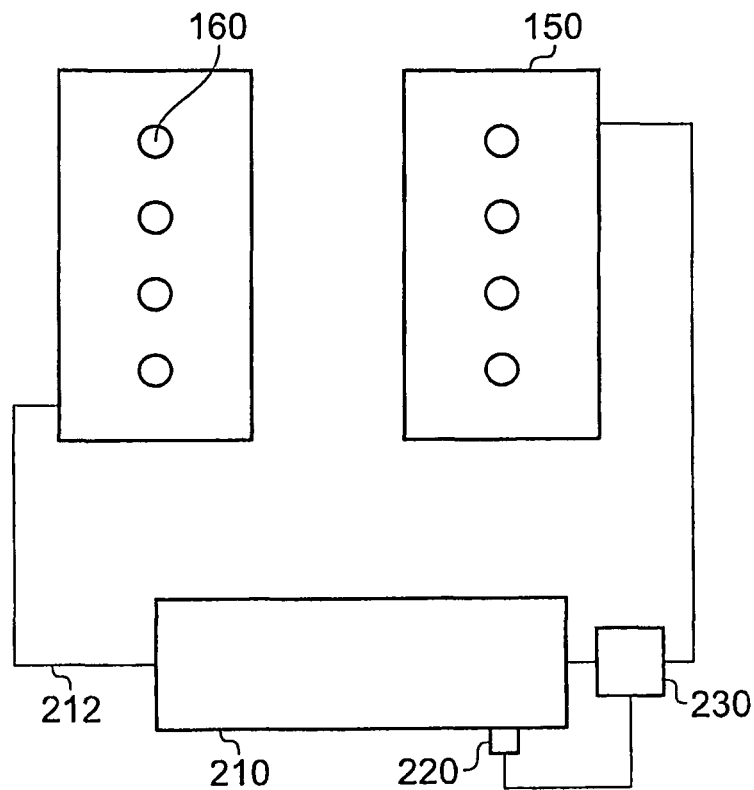
FIG. 7 shows the secondary thermal store in fluid exchange with a solar input device.
Figure 8:
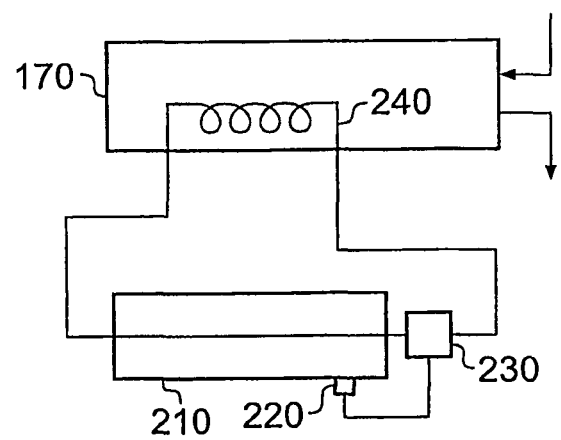
FIG. 8 shows the reservoir in heat exchange with a solar input device.

The solar collector may be arranged to provide heat to the condensate within the secondary store, as shown in FIG. 7, or to provide heat directly into the reservoir 170 as shown in FIG. 8. In FIG. 7 a solar collector 210 is connected by a pipe 212 to receive condensate from the secondary heat exchanger. A thermistor 220 monitors the temperature of the condensate within the solar panel 210 and once it is warm enough, causes a pump 230 to be briefly operated in order to move a predetermined warmed volume of condensate from the solar panel 210 back to the secondary heat exchanger's condensate store.

A similar arrangement is shown in FIG. 8 but this time the solar panel is connected to a further heat exchanger 240 within the reservoir 170. Thus water circulating within the solar panel 210 is in a closed loop such that damage to the panel does not result in leakage of water from the reservoir 170. Charge and bleed valves (not shown) may be provided in order to enable the fluid loop to the solar panel to be charged with water or an antifreeze solution. Once again, only when the liquid in the solar panel 210 has become sufficiently warm, as determined by the thermistor 220, is the pump 230 briefly activated. This prevents heat being lost from the reservoir 170 to the solar panel 210 during cold or cloudy days.

Figure 9:
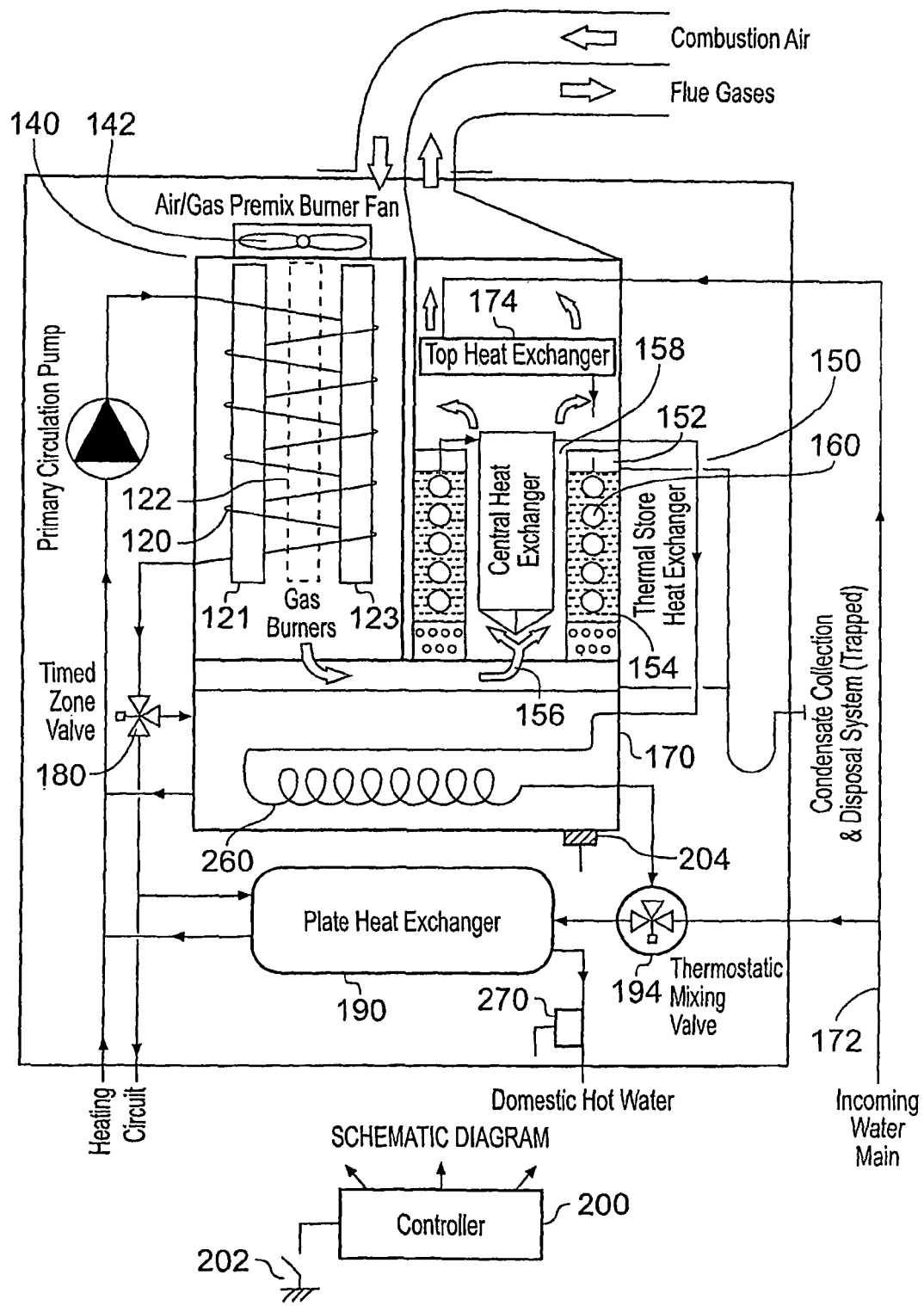
FIG. 9 shows a modification to the arrangement shown in FIG. 6 and constituting a second embodiment of the present invention.

FIG. 9 shows a further modification to the heating system in which the reservoir 170 is connectable via the valve 180 to space heating water. Thus, the reservoir is filled with what could be considered "dirty" water. If the boiler is running in space heating mode, then it would be very quick to replace the water in the reservoir 170 with warm water from the space heating system. Under such circumstances the water is likely to achieve a temperature of around 75° C. or so. In order to provide water for washing and the like, water from the cold main is directed firstly through the secondary heat exchanger, and then through the heat exchanger 260 where it picks up additional heat from the warm "dirty" water inside the reservoir 170 and is then directed towards the mixing valve 190. From then water is directed towards the further plate heat exchanger 190 before being discharged to a tap.

A pressure sensor 270 may be provided at the outlet of the plate heat exchanger 190 in order to signal to the controller when hot water is being drawn, thereby enabling operation of the blending valve 194.

Figure 10:
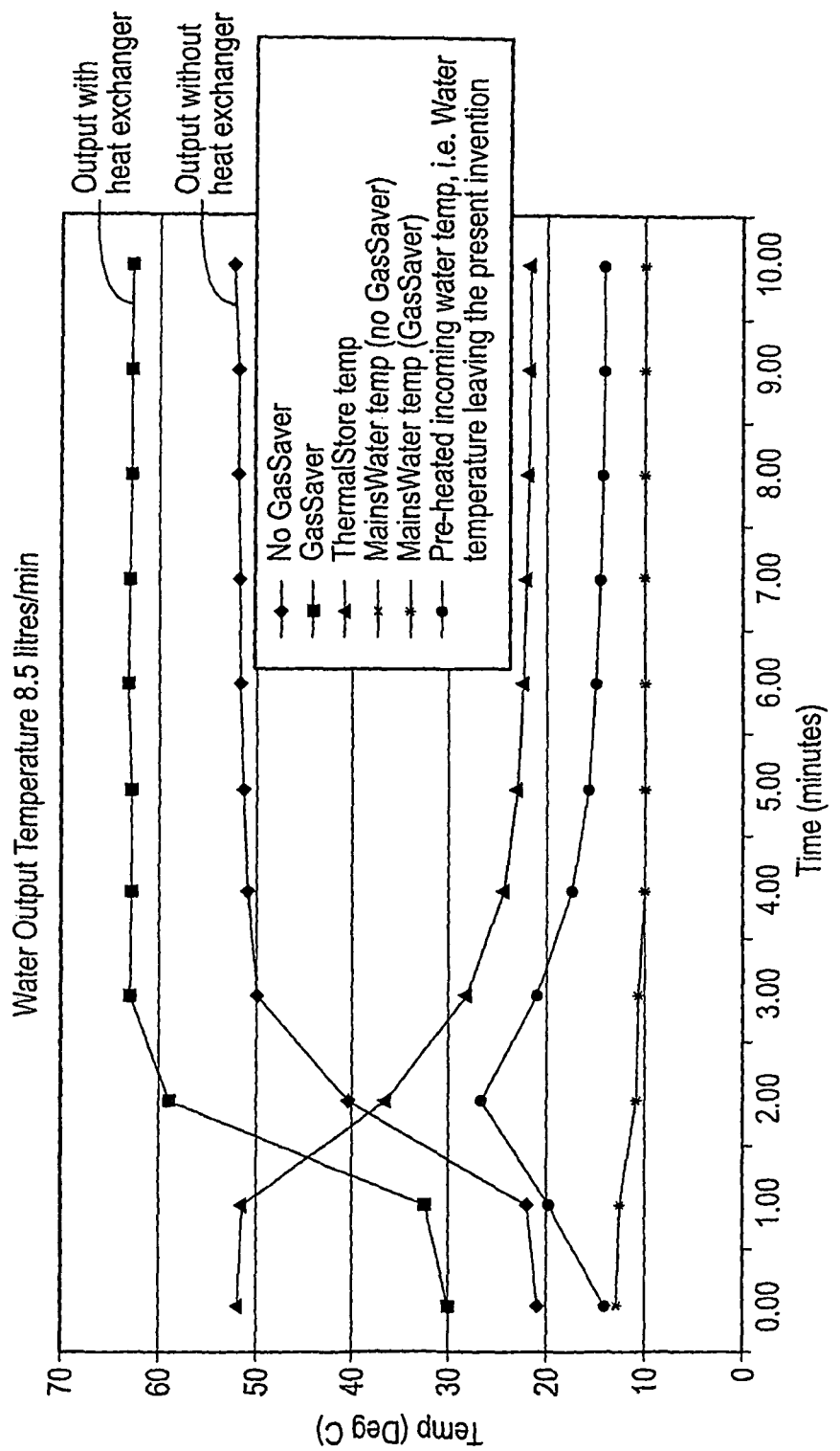
FIG. 10 is a graph showing the steady state performance of the system having a secondary heat exchanger (gas saver).

As noted hereinbefore, the use of the secondary heat exchanger 150 gives rise to an increase in boiler performance. FIG. 10 is a graph illustrating performance of a boiler under test conditions where a secondary heat exchanger under the trade mark gas saver was connected to the boiler, and the boiler performance was compared with the gas saver and without the gas saver. In each case the cold main temperature was held constant and the flow rate was held constant. Without the gas saver the water entering the boiler had a temperature of 10° C. and the ultimate output temperature of the boiler was around 53° C. However, when the gas saver was installed it warmed the water passing through it such that the water temperature at the inlet to the boiler had been raised to 14° C. However it could be seen that the water temperature at the outlet of the boiler enjoyed more than a 4° C. increase and in fact reached a steady state value of around 62° C. rather than the 53° C.

Therefore the inventor has found that a boiler having a burner rated at 15 kW hours can produce the same effect within a domestic dwelling as a boiler rated at 30 kW hours.

The present invention is particularly advantageous when used with well insulated dwellings. There has been a recent trend for dwellings to have increasing levels of insulation and hence the space heating requirement for such a dwelling becomes reduced. This results in the output power of the boiler required to heat the dwelling to an acceptable standard becoming reduced and consequently smaller boilers are being specified for these dwellings. However with the reduction in boiler output size, comes a equivalent reduction in hot water capability and consequently the time required to, for example, fill a bath becomes significantly increased. However the present invention allows a relatively low output boiler to achieve the performance of a higher output boiler over a short period of time for hot water production.

In a further variation of the arrangement shown in FIG. 9 a solar panel may be adapted to provide warm water into the reservoir 170 (as shown in FIG. 8). However where the reservoir contains water used for space heating it follows that the heat delivered from the solar panel into the reservoir could then be used as part of the space heating requirement by opening the valve between the reservoir 170 and the space heating circuit. This can be achieved either when the boiler is firing or when it is not.

The invention claimed is:

1. A heating system comprising:
    a boiler including a fuel burner in co-operation with a primary heat exchanger,
    a reservoir for storing water,
    a further heat exchanger arranged to receive heated fluid from the primary heat exchanger for heating the water to an output temperature,
    a blending valve having a first inlet for receiving water from a cold main, a second inlet for receiving water from the reservoir or for receiving water that has passed through a reservoir heat exchanger within the reservoir, and an outlet for supplying water to an inlet of the further heat exchanger,
    and a controller having a user interface,
    the controller signaling the water in the reservoir to be heated using the boiler to a temperature greater than the output temperature, removing water from the reservoir, or warming water by the reservoir heat exchanger, mixing the water with water from a cold main by the blending valve to obtain water at a blended target temperature lower than the required output temperature, and admitting the water at the blended temperature to the further heat exchanger to heat the water to the required output temperature.

2. A heating system as claimed in claim 1, wherein the burner comprises:
    a plurality of fuel burners
    the primary heat exchanger comprises at least one pipe,
    and wherein the at least one pipe passes between adjacent fuel burners.

3. A heating system as claimed in claim 1, in which liquid entering the reservoir passes through a secondary heat exchanger and is warmed by the secondary heat exchanger.

4. A heating system as claimed in claim 3, in which a heater coil is provided in the reservoir to heat the liquid therein.

5. A heating system as claimed in claim 1, in which the water from the reservoir is mixed with water from the cold main when providing hot water for washing or bathing.

6. A heating system as claimed in claim 1, having a user operable interface such that the user can signal in intention to the controller to use water in the near future.

7. A heating system as claimed in claim 1, in which the water from the reservoir is blended with the cold main by a temperature controlled valve prior to being admitted to a further heat exchanger.

8. A heating system as claimed in claim 1, in which the reservoir is connectable to a space heating circuit such that water therefrom exchanges with water in the reservoir, and a heat exchanger is provided within the reservoir for warming water for providing hot water.

9. A heating system as claimed in claim 8, in which the water passing through the heat exchanger in the reservoir is blended with cold water prior to being warmed in a further heat exchanger.

10. A heating system as claimed in claim 1, further including a solar collector for warming water in the reservoir.

* * * * *